(12) United States Patent
Yates

(10) Patent No.: US 12,166,787 B2
(45) Date of Patent: Dec. 10, 2024

(54) SYSTEM CONFIGURED TO DETECT AND BLOCK THE DISTRIBUTION OF MALICIOUS CONTENT THAT IS ATTRIBUTABLE TO AN ENTITY

(71) Applicant: Starguard, Inc., Fort Lauderdale, FL (US)

(72) Inventor: Jordan Yates, Fort Lauderdale, FL (US)

(73) Assignee: STARGUARD, INC., Fort Lauderdale, FL (US)

( * ) Notice: Subject to any disclaimer, the term of this patent is extended or adjusted under 35 U.S.C. 154(b) by 37 days.

(21) Appl. No.: 18/158,314

(22) Filed: Jan. 23, 2023

(65) Prior Publication Data
US 2024/0154988 A1     May 9, 2024

Related U.S. Application Data

(60) Provisional application No. 63/382,851, filed on Nov. 8, 2022.

(51) Int. Cl.
*H04L 9/40*     (2022.01)
*H04L 41/16*     (2022.01)

(52) U.S. Cl.
CPC .......... *H04L 63/1433* (2013.01); *H04L 41/16* (2013.01); *H04L 63/102* (2013.01); *H04L 63/145* (2013.01)

(58) Field of Classification Search
CPC . H04L 63/1433; H04L 63/102; H04L 63/145; H04L 41/16
See application file for complete search history.

(56) References Cited

U.S. PATENT DOCUMENTS

| 9,420,017 B2 * | 8/2016 | Edson ................ G06F 16/93 |
| 11,463,455 B1 | 10/2022 | Huang et al. |

(Continued)

FOREIGN PATENT DOCUMENTS

| CN | 101884047 B | * | 7/2013 | .......... G06F 21/564 |
| CN | 110462606 A | * | 11/2019 | ............ G06F 16/35 |

OTHER PUBLICATIONS

Drichel et al., "The More, the Better? A Study on Collaborative Machine Learning for DGA Detection", arXiv, Sep. 24, 2021, retrieved on [Jan. 1, 2024]. Retrieved from the internet <URL: ttps://arxiv.org/abs/2109.11830—12 pages.

(Continued)

*Primary Examiner* — Sarah Su
(74) *Attorney, Agent, or Firm* — PERKINS COIE LLP

(57) ABSTRACT

An online portal receives digital content from a user device. The online portal is communicably coupled to a computer server hosting an online media service in the public or non-public domain. The user device is associated with an online account on the online media service. Based on the digital content, at least one requirement associated with the online account is identified. One or more respondent services are determined satisfy the requirement. By each respondent service, the digital content is processed using a respective machine learning model trained, based on user-attributable content, to generate a respondent evaluation. A quorum of respondent evaluations is generated. The quorum of respondent evaluations is determined to achieve a respondent consensus. Responsive to determining that the respondent consensus satisfies an approval condition, the digital content is sent from the online portal to the computer server for posting the digital content on the online media service.

17 Claims, 11 Drawing Sheets

(56) References Cited

U.S. PATENT DOCUMENTS

| | | | | |
|---|---|---|---|---|
| 11,792,197 | B1 * | 10/2023 | Yu | H04L 63/102 |
| | | | | 726/4 |
| 11,838,306 | B2 * | 12/2023 | Weingarten | G06F 21/554 |
| 2018/0018590 | A1 * | 1/2018 | Szeto | G16H 50/20 |
| 2018/0255086 | A1 * | 9/2018 | Kuperman | G06F 21/53 |
| 2018/0288063 | A1 * | 10/2018 | Koottayi | G06F 21/50 |
| 2019/0303571 | A1 * | 10/2019 | Chelarescu | H04L 63/1416 |
| 2021/0377288 | A1 * | 12/2021 | Chen Kaidi | H04L 63/1416 |
| 2021/0397903 | A1 * | 12/2021 | Raj | H04L 67/535 |
| 2023/0199025 | A1 * | 6/2023 | Xu | H04L 63/0861 |
| | | | | 726/22 |
| 2024/0154941 | A1 * | 5/2024 | Nagpal | H04L 63/18 |

OTHER PUBLICATIONS

International Search Report and Written Opinion mailed Feb. 16, 2024 of PCT/US2023/036766—15 pages.

\* cited by examiner

SYSTEM CONFIGURED TO DETECT AND BLOCK THE DISTRIBUTION OF MALICIOUS CONTENT THAT IS ATTRIBUTABLE TO AN ENTITY

CROSS-REFERENCE TO RELATED APPLICATION

This application claims the benefit of U.S. Provisional Application No. 63/382,851, filed Nov. 8, 2022, titled "ARTIFICIAL INTELLIGENCE-BASED FILE MANAGEMENT AND EVALUATION OF DIGITAL CONTENT," which is incorporated herein by reference in its entirety.

TECHNICAL FIELD

The present disclosure is generally related to evaluating and managing the distribution of malicious content that is attributable to a person or organization.

BACKGROUND

In today's interconnected and global marketplace, companies and other entities often maintain an online presence. Maintaining an online presence involves posting digital content that is timely and pertinent to an audience on a fairly regular basis. Online platforms, both public (e.g., social media) and private (e.g., a company intranet), can provide entities (e.g., a person, persons, organization, organizations, or other users) with a means of engaging with customers and clients, as well as with employees and potential business partners, at scale and with low overhead. However, some of the factors leading to online brand success (e.g., posting content more quickly in response to current events or on a regular basis) also place posters at the greatest risk. For example, posting content that is offensive on an online platform can result in a loss of business, employment opportunities, capital, or reputation.

BRIEF DESCRIPTION OF THE DRAWINGS

Detailed descriptions of implementations of the present technology will be described and explained through the use of the accompanying drawings.

Figure 1:
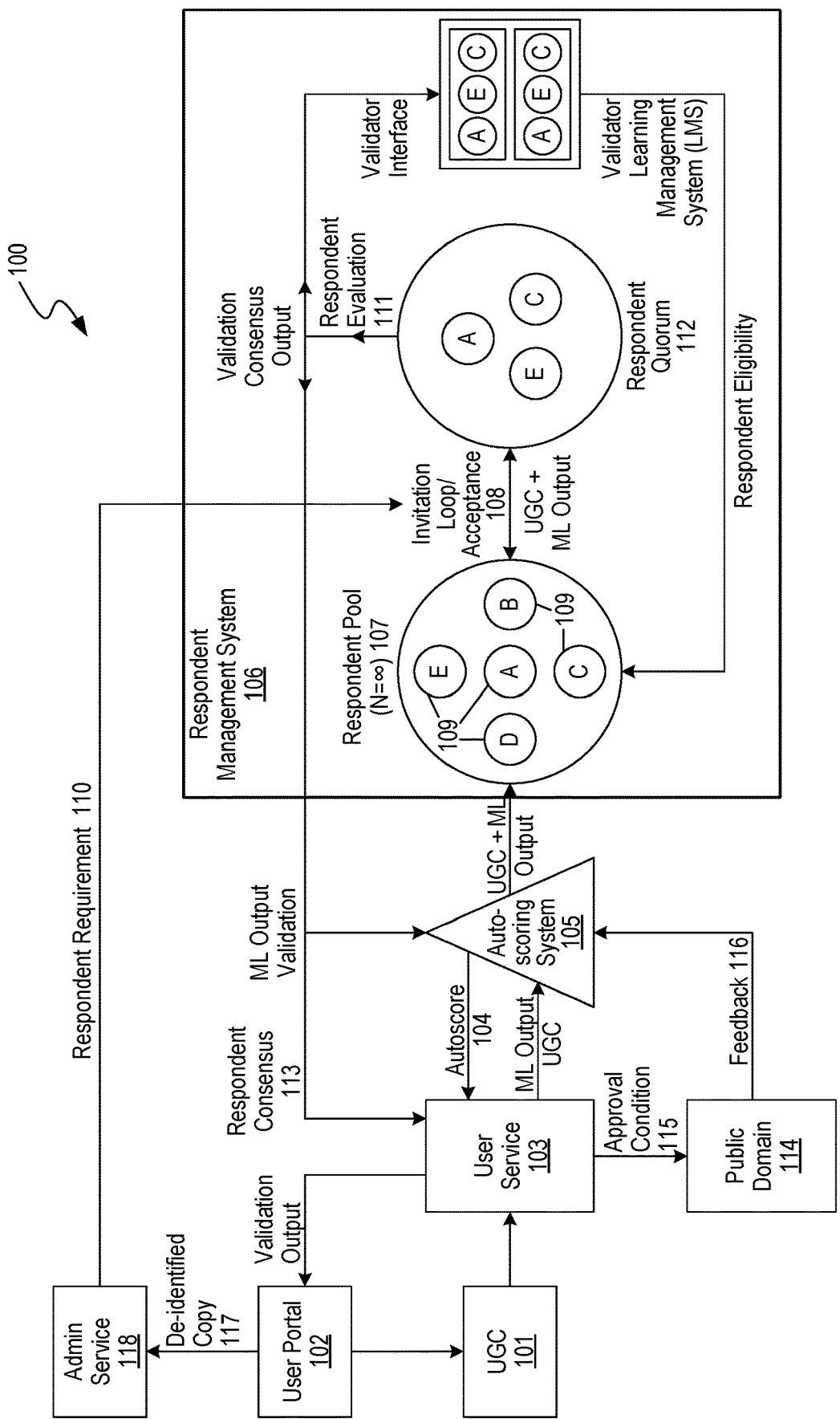
FIG. 1 is a block diagram illustrating an example method for real-time detection and blocking of malicious content that is attributable to an entity.

The disclosed technologies will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

This specification describes technology for detecting and blocking the distribution of malicious content that is attributable to an entity. In some implementations, systems for real-time evaluation of user-attributable content include one or more memory devices storing instructions, and one or more processors configured to execute the instructions to perform operations. These operations can include receiving, at an online portal, the digital content from a user device. The user can be a person, persons, organization, etc. The online portal is communicably coupled to a computer server. The computer server hosts an online media service in the public or non-public domain. For example, such online media services can include media sharing websites, discoverable online correspondences, completely private blockchain ledgers, and corporate intranets. The user device is associated with an online account on the online media service. Based on the digital content, at least one requirement associated with the online account is identified, and one or more respondent services from multiple respondent services of the system are determined to satisfy the at least one requirement. From the portal, the digital content is sent to these one or more respondent services for evaluation, where it is processed using a machine learning model. Each respondent service has its own model trained on user-attributable content to generate a respondent evaluation. An example machine learning system 600 is illustrated and described in more detail with reference to FIG. 6.

The online portal determines that a quorum of respondent evaluations have been generated, and that the quorum has achieved a respondent consensus. When the respondent consensus satisfies an approval condition, the digital content is sent from the online portal to the computer server for posting on the online media service using the online account.

Technologies of the present disclosure will be described more thoroughly from now on with reference to the accompanying drawings. Like numerals represent like elements throughout the several figures, and in which example implementations are shown. However, implementations of the examples can be embodied in many different forms and should not be construed as limited to the implementations described. The examples are non-limiting examples and are merely examples, among other possible examples. Throughout this specification, plural instances (e.g., "612") can implement components, operations, or structures (e.g., "612a") described as a single instance. Further, plural instances (e.g., "612") refer collectively to a set of components, operations, or structures (e.g., "612a") described as a single instance. The description of a single component (e.g., "612a") applies equally to a like-numbered component (e.g., "612b") unless indicated otherwise. These and other aspects, features, and implementations can be expressed as methods, apparatuses, systems, components, program products, means or steps for performing a function, and in other ways. These and other aspects, features, and implementations will become apparent from the following descriptions, including the examples.

The advantages and benefits of the disclosed technology include improved methods for real-time evaluation and screening of user-attributable content compared to traditional systems. The disclosed systems can align campaign-related communications within a large or global organization. The communications alignment systems can take into account keywords, key messaging concepts, and translations, etc. Compared to conventional methods, the disclosed methods can track differences between message parameters of an organization versus the actual real-time posts of users about a campaign. In addition, the advantages of the neural network (NN) used for machine learning (ML) in the disclosed technology include the ability to model non-linear and complex relationships among apparently unrelated inputs, especially for those inputs with high volatility and non-constant variance, as well as the ability to generalize from such inputs to make predictions regarding unseen data.

FIG. 1 is a block diagram illustrating an example method 100 for real-time detection and blocking of malicious content that is attributable to an entity. The disclosed technology includes a computer-implemented method for real-time detection of malicious content that can be attributed to a user, and blocking the content's distribution. The example method 100 is illustrated in the block diagram of FIG. 1.

The method 100 includes capturing user-attributable content input at an endpoint device (e.g., a desktop computer, laptop, tablet, mobile device, or other devices configured to capture image, video, text, or other content, and/or share such content to other such devices) for distribution to one or more users of a media service. The method 100 includes hosting user-attributable content 101 (e.g., text, image, audio recording, video, or 3D-video data) in a user portal 102 connected to a user service 103, and evaluating the user-attributable content 101 with an autoscore 104 assigned by an autoscoring system 105 in the user service 103. The user-attributable content 101 is attributable to a user of a media service. The user of the media service is based on an identity of the user that is referenced by the user-attributable content. In some implementations, the identity of the user includes metatextual analysis (e.g., real-world reputation of the user, audience expectations of the user). In other implementations, the identity of the user includes demographic information (e.g., age, gender, profession, nationality, race). The autoscoring system can be replaced by an evaluation system, which can include or exclude human evaluators, and/or techniques used to evaluate different forms of media for posts. The user-attributable content 101 is sent to a respondent management system 106 overseeing a pool of respondent services 107. An invitation 108 is sent from the respondent management system 106 to the pool of respondent services 107. In some implementations, the process of FIG. 1 is performed by a computer system, e.g., the example computer system 700 illustrated and described in more detail with reference to FIG. 7.

The invitation is accepted by a respondent service 109 from the pool of respondent services 107. It is determined that the respondent service 109 meets a set of respondent requirements 110. The set of respondent requirements 110 can require that a respondent service 109 be configured for a particular user-type or a particular content-type, matching a type of user or a type of content of the user-attributable content 101. In some implementations, the set of respondent requirements 110 includes an evaluation metric. For example, a respondent service 109 with an accuracy or an f1 score below a certain threshold can be excluded from invitation. In other implementations, the at least one requirement specifies a particular content-type, for those respondent services specializing in a particular media format (e.g., text, picture, audio, video), in a particular media service (e.g., video-sharing, message boards, posts to followers), a particular user-type (e.g., an athlete, a politician, a religious figure, a musician, a comedian), or a reputation (e.g., family-friendly, provocative).

A respondent evaluation 111 is sent from each respondent service 109 to the user service 103. A quorum of respondent evaluations 112 is generated. A respondent consensus 113 is formed from the quorum of respondent evaluations 112. The user-attributable content 101 is sent to a user-specified public or non-public domain 114 when the respondent consensus 113 satisfies an approval condition 115. Feedback 116 is retrieved from the user-specified public or non-public domain 114. The user-attributable content 101 is blocked from the user-specified public or non-public domain 114 when the respondent consensus 113 does not satisfy the approval condition 115. A de-identified copy 117 of the user-attributable content that cannot be traced back to the user portal 102 is saved to an administrative database accessible through an administrative service 118. Particular entities, for example, the ML, system 600 perform some or all of the steps of the process in some implementations. The ML system 600 is illustrated and described in more detail with reference to FIG. 6. Likewise, implementations can include different and/or additional steps, or perform the steps in different orders.

In some implementations, the ML system 600 includes an AI chatbot (e.g., ChatGPT) which generates the autoscore 104 of user-attributable content 101. The autoscore 104 can include a continuous measurement on a single bipolar dimension, from negative to positive (e.g., malicious to safe), an explanation for the measurement or which specific parts of the user-attributable content 101 were most influential in deciding the measurement. Additionally, the AI chatbot validates the respondent evaluation 111 from each respondent service 109. Validating the respondent evaluation 111 includes providing feedback to the respondent service 109 that provided the evaluation 111. In such implementations, the feedback is dependent on metadata associated with the user portal 102, so that the feedback changes according to user status, number of followers, user brand, audience expectations, etc.

In some embodiments, the method 100 can include providing the feedback 116 and the respondent consensus 113 as inputs to the autoscoring system 105. The method 100 can include defining the respondent requirements 110 based on the user portal 102 in the administrative service 118. The respondent evaluation 111 can be sent to a learning module that is associated with each respondent service 109 that accepted the invitation 108 and met the requirements 110. The learning module can also be referred to as a Validator Learning Management System, as in FIG. 1, which is accessible to every respondent service. Within the Validator Learning Management System, the respondent services can access and learn from the evaluations made by other respondent services to equivalent user-attributable content. The purpose of such inter-respondent service learning is to allow the performance of the highest performing respondent services to influence other respondent services, without wholly copying over their weights and methods and thereby creating a feedback loop prone to over-fitting and other such errors based on limited data.

In other examples of the method 100, processing the user-attributable content 101 in the respondent service 109 includes modifying user-attributable content 101. Modifying can include actions to provide a real-time assessment of user-attributable content 101, prevent delivery of user-attributable content 101 to the public or non-public domain 114, or mitigate or amplify the user-attributable content 101. For example, particular words, icons, audio clips, or video clips can be replaced, removed, or changed in the user-attributable content 101.

Sending the user-attributable content 101 to the respondent management system 106 can also include creating a pod. The pod can be a respondent service 109 or a group of respondent services chosen by the user service 103 or by the administrative service 118 to respond to the user-attributable content 101. Geographic data (e.g., current location, residence zip code, language preference, or respondent level) from the respondent service 109 can assist in determining pod membership.

In some examples, the user service 103 can have an account management rate. In such examples, the method 100 can include deciding a user profile based on user data taken from the user portal and the user-specified public or non-public domain (e.g., followers, on-platform engagement, off-platform engagement, or soft credit score). A projected audience can be determined for the user service 103 based on the user profile. A risk multiple percentage can be determined based on the projected audience and the user data. Continuing with the theme, a base price can be combined with the risk multiple percentage to determine an account management rate.

Embodiments of the disclosed technology can include the use of a feedback log containing instances of feedback. After making such determinations, the method 100 can include a step in which the time to respond is compared to the first average response speed as well as to the second average response speed. Such comparison can yield a respondent speed score.

The method 100 can include a comparison of the respondent evaluation 111 to the autoscore 104 as well as to the feedback 116 from the user-specified domain 114 to determine a current grade. Expanding on the current grade, the method 100 can include a comparison between a log of respondent evaluations to a log of autoscores and the feedback log to determine a historical grade. A respondent quality score can be determined for the respondent service 109 based on the current grade, the historical grade, and the respondent speed score. Additional factors can be considered in the respondent quality score, such as threat selection, a ratio of accepted versus rejected tasks, sentiment analysis of the user-attributable content, engagement analysis of the user-attributable content, etc.

The feedback log can include retweets, likes, news, interviews, and message boards, etc. In the applicable embodiments, the method 100 can include estimating how the projected audience will respond to a hypothetical user-attributable content based on the feedback log. The estimation can include determining audience trust, sentiment, and distance from a core audience.

The method 100 can include determining the size of the projected audience for a particular entity based on the user profile and the feedback log. Such a determination can be based on historical engagement, consumer purchase behavior, cross platform viewership, attendance, key representative values, et cetera. The method 100 can additionally include determining a potential change to the size of the projected audience based on the hypothetical user-attributable content.

The method 100 can be implemented by a non-transitory computer-readable storage medium storing computer instructions. When the instructions are executed by one or more computer processors, they cause the one or more computer processors to perform a series of actions. An action causes the processors to host a user-attributable content in a user portal connected to a user service. The processors evaluate the user-attributable content with an autoscore assigned by an autoscoring system in the user service. The processors to send the user-attributable content to a respondent management system overseeing a pool of respondent services. Subsequently, they send an invitation from the respondent management system to the pool of respondent services, where a respondent service can accept the invitation from the pool of respondent services. If the respondent service satisfies a set of respondent requirements, that respondent service is validated and can process the user-attributable content in a machine learning model trained to output a respondent evaluation from an inputted user-attributable content.

The respondent service can send the respondent evaluation to the user service, which can wait for a quorum of respondent evaluations to be generated. At such a time, a respondent consensus can form from the quorum of respondent evaluations. The user-attributable content can be sent to a user-specified public or non-public domain when the respondent consensus satisfies an approval condition, which can cause feedback to be retrieved from the user-specified public or non-public domain. When the respondent consensus does not satisfy the approval condition, the user-attributable content will be blocked from the user-specified public or non-public domain. Finally, the processors save a secure copy of the user-attributable content to an administrative database, accessible through an administrative service.

Figure 2:
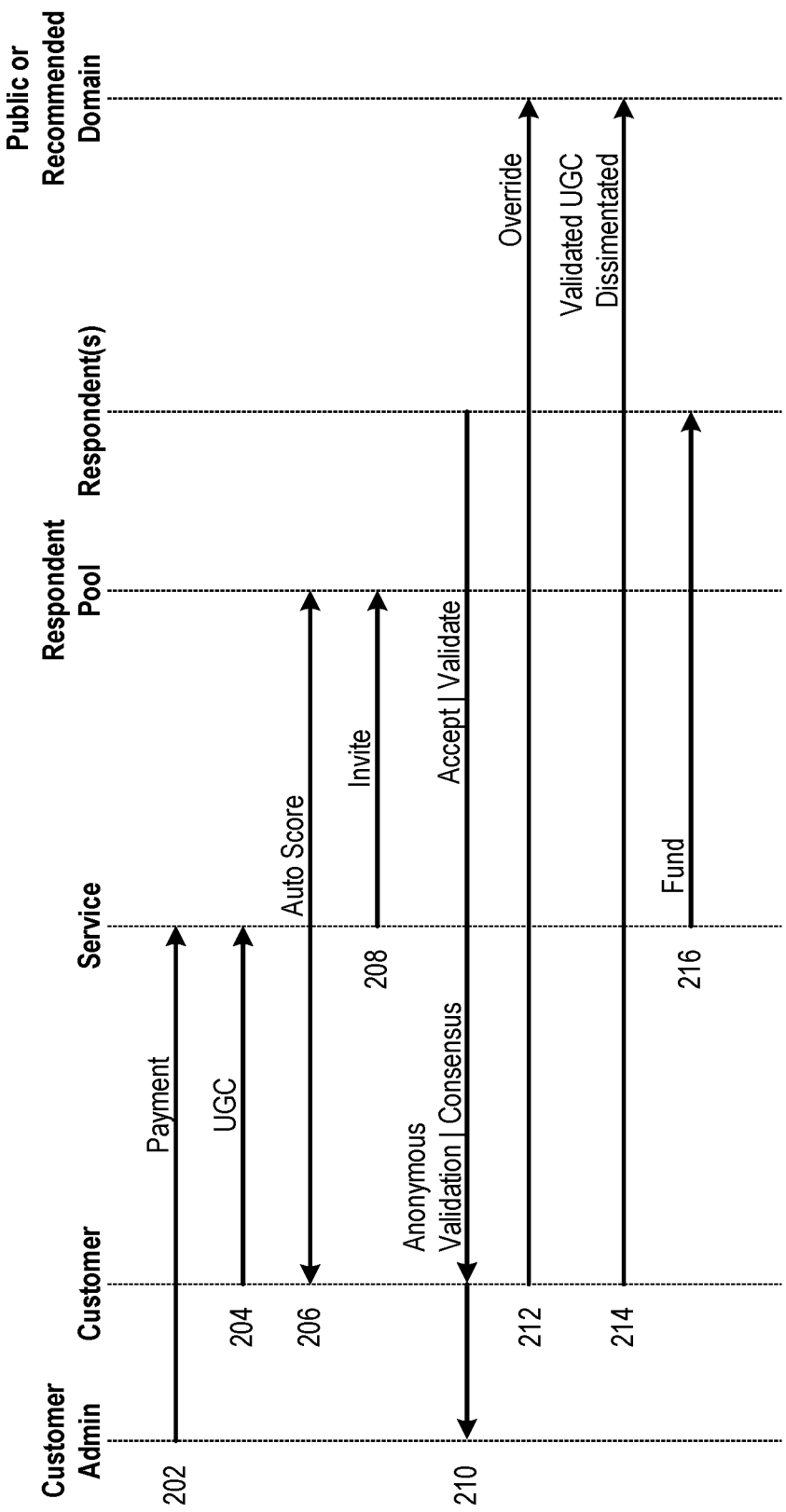
FIG. 2 is a flow diagram illustrating an example sequence of transactions occurring between different parts of a system.

FIG. 2 is a flow diagram illustrating an example sequence of transactions occurring between different parts of a system. In some implementations, the process of FIG. 2 is performed by a computer system, e.g., the example computer system 700 illustrated and described in more detail with reference to FIG. 7. Particular entities, for example, the ML system 600 perform some or all of the steps of the process in other implementations. The ML system 600 is illustrated and described in more detail with reference to FIG. 6. Likewise, implementations can include different and/or additional steps, or perform the steps in different orders.

The term "malicious content" refers to digital content that elicits a negative response. The negative response can include a magnitude and an intensity determined by data scraped from the media service and other media services. The scraped data can include comments, retweets, shares, reactions, views, interviews, or message boards posted by other users to the media service and other media services in response to the digital content. The scraped data used to determine the magnitude of the negative response can include a ratio of negative scraped data to positive scraped data. The scraped data used to determine the intensity of the negative response can include a sentiment analysis of the scraped data, in which the sentiment analysis can be based on a count of all words in the scraped data that match a negative words list. The scraped data can include demographic metadata allowing separate calculations of magnitude and intensity according to age, gender, race, income bracket, educational attainment, geographic location, and user-generated hashtags.

Referring now to FIG. 2, a computer system accepts a payment from a customer administrator—on behalf of a customer—in return for providing the customer service 202. The customer service 202 includes allowing a customer to submit content 204 that is attributable to them (abbreviated UGC in the figure). The user-attributable content 204 is evaluated with an autoscore assigned by an autoscoring system in the user service 206. In some implementations, the user-attributable content is sent to a respondent management system overseeing a pool of respondent services. An invitation from the respondent management system is sent to the pool of respondent services 208.

In some implementations, the invitation is accepted by a respondent service from the pool of respondent services and the respondent service is validated to meet a set of respondent requirements 210. In the respondent service, the user-attributable content is processed in a machine learning model trained to output a respondent evaluation from an inputted user-attributable content. The respondent evaluation is sent from each respondent service to the user service 216. In some implementations, the user service 216 is a program or an application running on the endpoint device or hosted by a cloud service, which is accessible by a user and is configured to allow the user to generate and share user-attributable content.

In some implementations, the computer system waits for a quorum of respondent evaluations to be generated. A respondent consensus is formed from the quorum of respondent evaluations 210. The user-attributable content 204 is sent to a user-specified public or non-public domain when the respondent consensus satisfies an approval condition 214.

In some implementations, feedback is retrieved from the user-specified public or non-public domain. The user-attributable content 204 is blocked from the user-specified public or non-public domain when the respondent consensus does not satisfy the approval condition. An alternate implementation allows the customer administrator to override the blocking to post the user-attributable content 204 to the user-specified public or non-public domain 212. A secure copy of the user-attributable content 204 is saved to an administrative database, accessible through an administrative service. In some implementations, the feedback and the respondent consensus are provided as inputs to the autoscoring system. The respondent requirements can be defined based on the user portal in the administrative service. In other implementations, the respondent requirements can be defined in the user portal. Alternatively, the user portal and administrative service can both be accessible to the customer. The respondent evaluation can be sent to a learning module associated with each respondent service that accepted the invitation and met the requirements. Finally, funding is provided to the respondent services from the user service 216. Funding can take the form of monetary payment, weighting for a machine learning algorithm, a recommendation for a social profile, etc.

Figure 3:
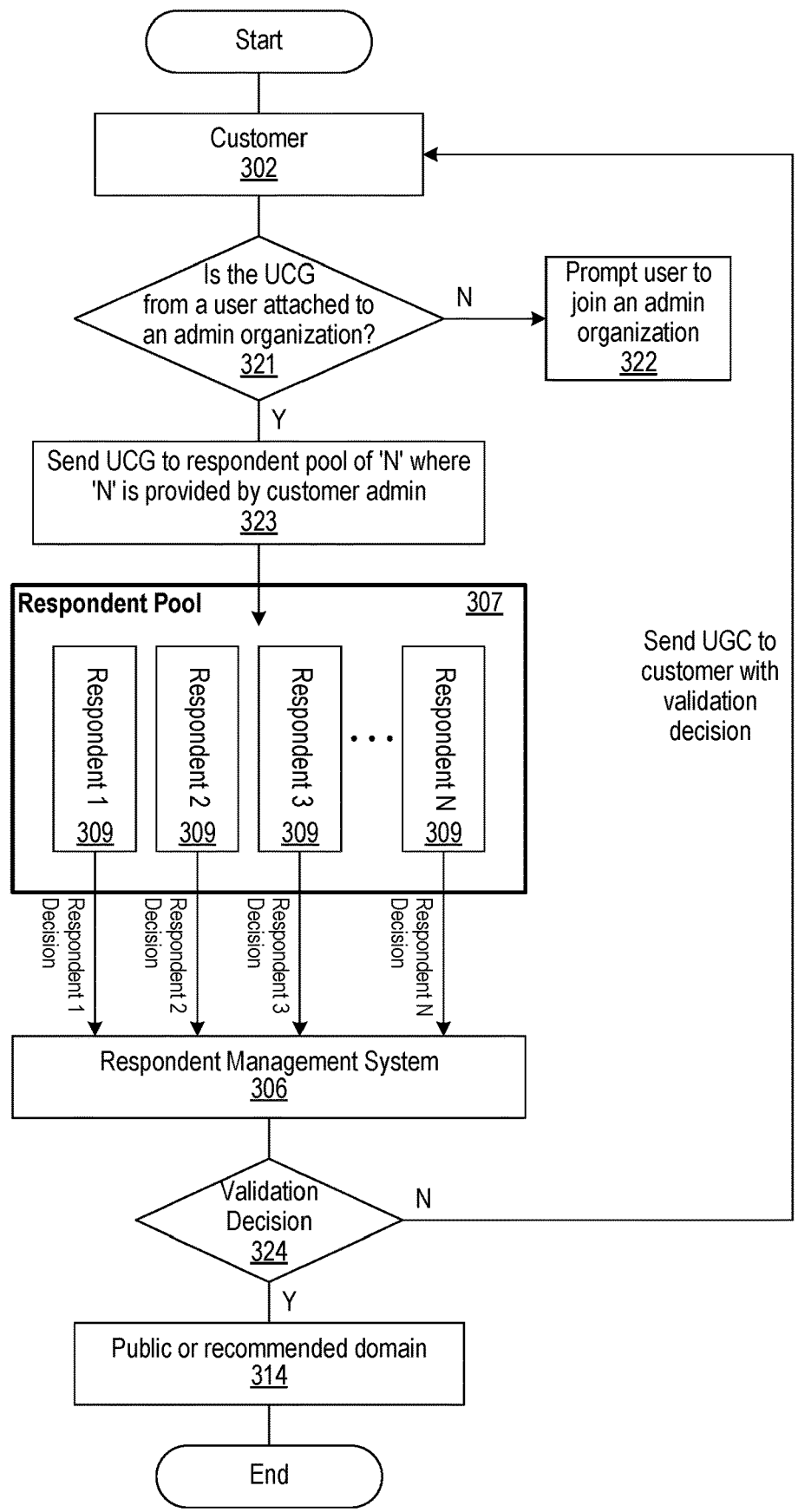
FIG. 3 is a flow diagram illustrating an example process for detecting and blocking the distribution of malicious content that is attributable to an entity.

FIG. 3 is a flow diagram illustrating an example process for detecting and blocking the distribution of malicious content that is attributable to an entity. In some implementations, the process of FIG. 3 is performed by a computer system, e.g., the example computer system 700 illustrated and described in more detail with reference to FIG. 7. Particular entities, for example, the ML system 600 perform some or all of the steps of the process in other implementations. The ML system 600 is illustrated and described in more detail with reference to FIG. 6. Likewise, implementations can include different and/or additional steps, or perform the steps in different orders.

At an online user portal, digital content is received from a user device. In FIG. 3, the digital content is referred to as a "UCG" and the user device is referred to as the Customer 302. The online portal is communicably coupled to a computer server hosting an online media service in the public or non-public domain. The user device is associated with an online account on the online media service. At a step in the process 321, it is determined whether or not the online account is attached to an admin organization. If it is not, then the user is prompted to join an admin organization 322; if the online account is already attached to an admin organization, then the digital content is sent to a respondent pool 307. The respondent pool 307 includes one to 'N' number of respondents 309. The 'N' number is provided by customer admin in a process step 323. Each respondent 309 makes a decision which is sent to the Respondent Management System 306, which determines if the respondent decisions—when taken in the aggregate—meet a validation decision 324. If not, then the digital content is blocked and returned to the Customer 302 with the validation decision 324. If so, then the digital content is sent on to the public or recommended domain 314 and the process is concluded. In some implementations, based on the digital content, at least one requirement associated with the online account is identified. In some implementations, a computer system determines that one or more respondent services from multiple respondent services of the system satisfies the at least one requirement. Additionally, the workflow of a user needing to be part of an organization is optional. The service can be offered to individual users so that they can set up pods or subscribe to have the service monitor and manage their particular accounts.

Figure 4A:
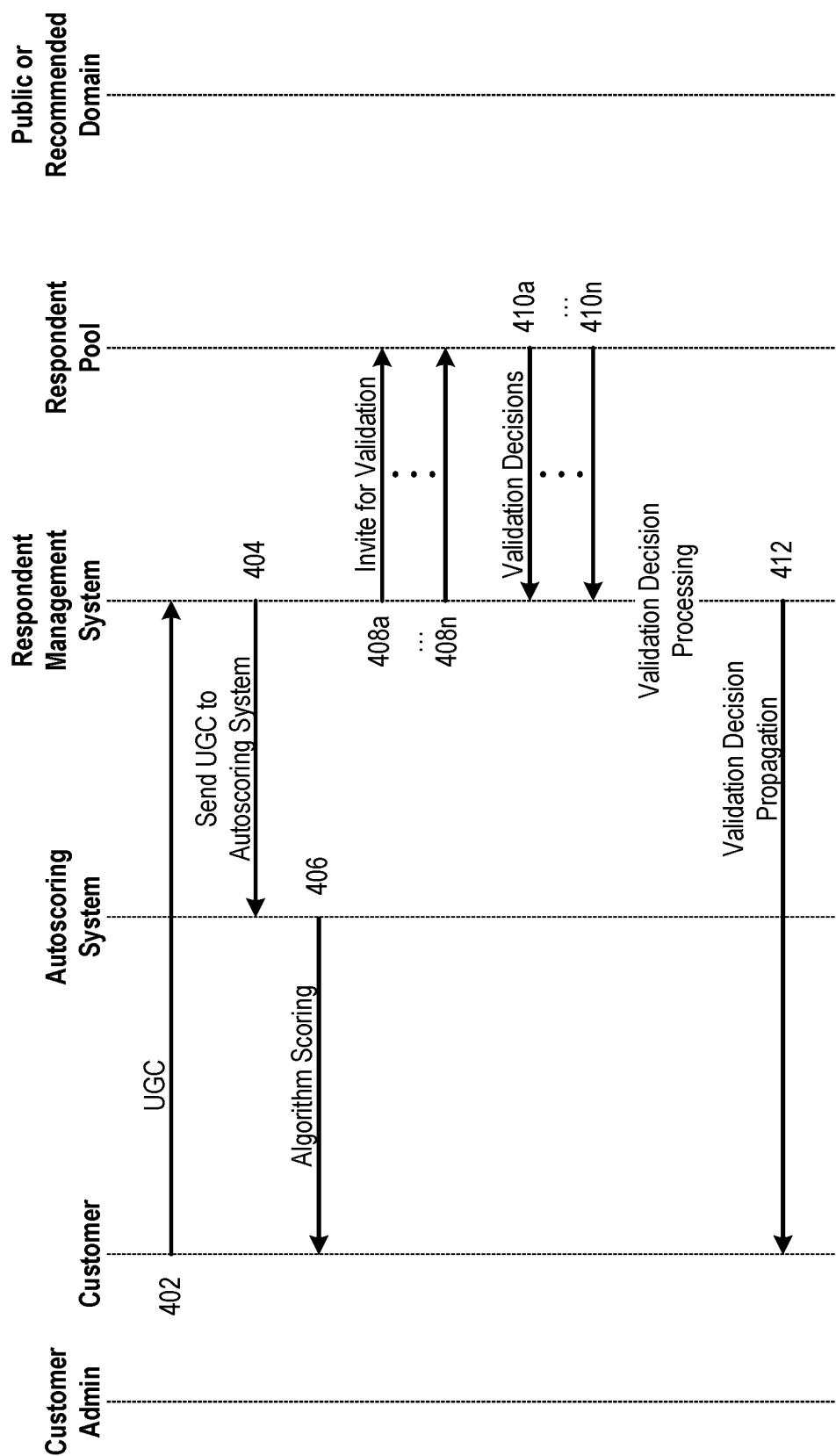
FIG. 4A is a flow diagram illustrating an example process for evaluation of digital content.
Figure 4B:
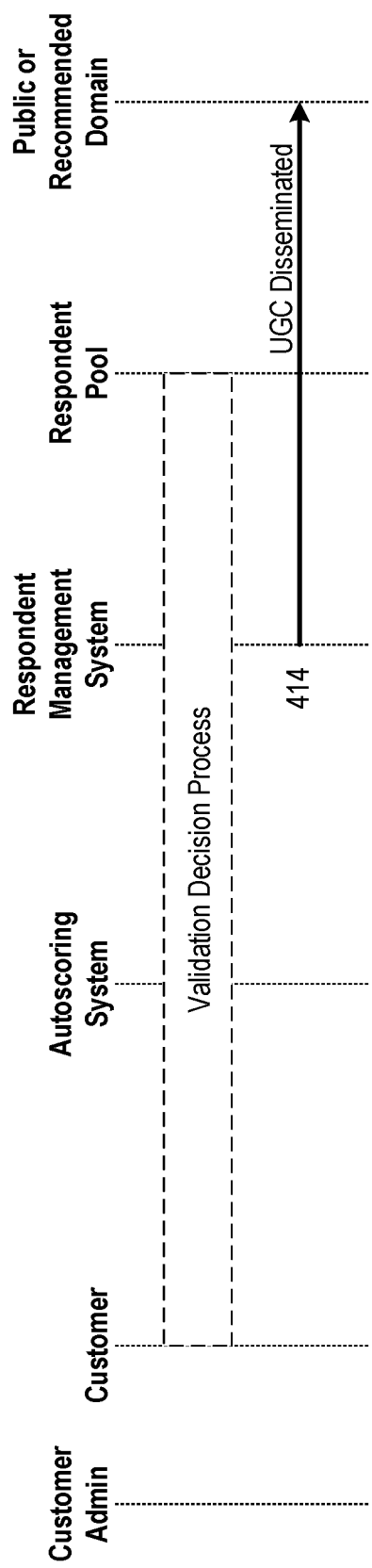
FIG. 4B is a flow diagram illustrating example steps for disseminating content that is attributable to an entity.
Figure 4C:
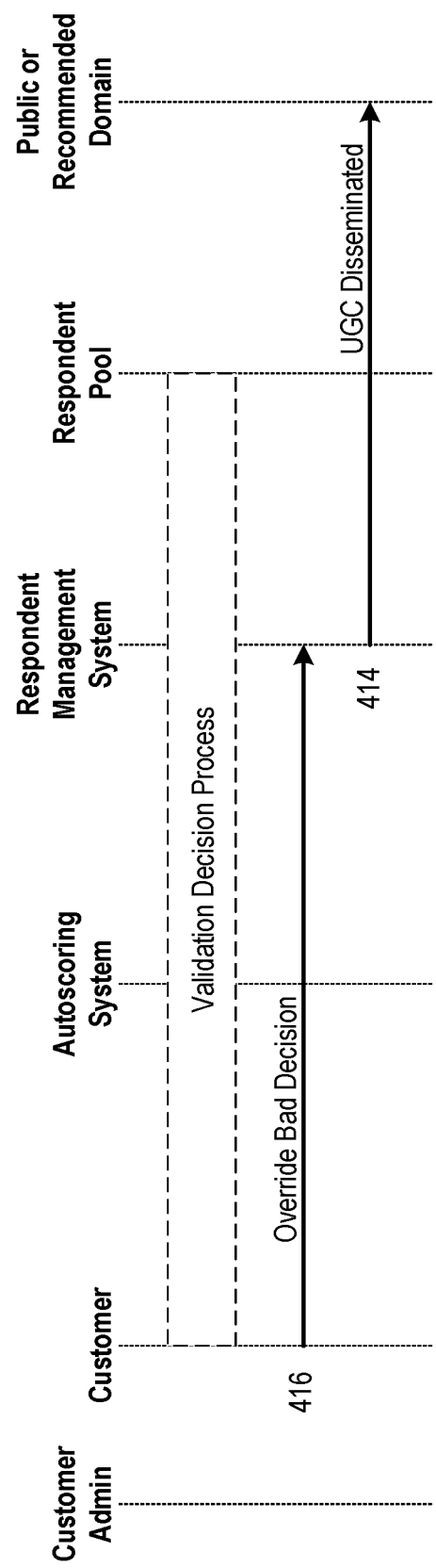
FIG. 4C is a flow diagram illustrating an example customer override.

FIG. 4A is a flow diagram illustrating an example process for evaluation of digital content. FIG. 4B is a flow diagram illustrating example steps for disseminating user-attributable content. FIG. 4C is a flow diagram illustrating an example customer override. In some implementations, the processes of FIG. 4A, 4B, or 4C are performed by a computer system, e.g., the example computer system 700 illustrated and described in more detail with reference to FIG. 7. Particular entities, for example, the ML system 600 perform some or all of the steps of the processes in other implementations. The ML system 600 is illustrated and described in more detail with reference to FIG. 6. Likewise, implementations can include different and/or additional steps, or perform the steps in different orders. Referring now to FIGS. 4A, 4B, and 4C, a computer system hosts a user-attributable content in a user portal connected to a user service 402. The user-attributable content is evaluated with an autoscore assigned by an autoscoring system in the user service 404. That autoscore is provided to the user portal 406. In some implementations, the user-attributable content is sent to a respondent management system overseeing a pool of respondent services. Invitations from the respondent management system are sent to the pool of respondent services to be distributed to n number of respondent services, as illustrated in steps 408a to 408n.

In some implementations, the invitation is accepted by the respondent services from the pool of respondent services. The respondent services are validated to meet a set of respondent requirements, as illustrated in steps 410a to 410n. The decision is propagated from the respondent management system to the customer 412. In the respondent service, the user-attributable content is processed in a machine learning model trained to output a respondent evaluation from an inputted user-attributable content. The respondent evaluation is sent from each respondent service to the user service. In some implementations, the computer system waits for a quorum of respondent evaluations to be generated. A respondent consensus is formed from the quorum of respondent evaluations. The user-attributable content is sent to a user-specified public or non-public domain when the respondent consensus satisfies an approval condition 414.

In some implementations, feedback is retrieved from the user-specified public or non-public domain. The user-attributable content is blocked from the user-specified public or non-public domain when the respondent consensus does not satisfy the approval condition. An alternate implementation allows the customer to override the blocking to post the user-attributable content to the user-specified public or non-public domain 416. A secure copy of the user-attributable content is saved to an administrative database, accessible through an administrative service. In some implementations, the feedback and the respondent consensus are provided as inputs to the autoscoring system. The respondent requirements can be defined based on the user portal in the administrative service. The respondent evaluation can be sent to a learning module associated with each respondent service that accepted the invitation and met the requirements.

In some implementations, processing the user-attributable content in the respondent service comprises modifying the user-attributable content. Sending the user-attributable content to the respondent management system. A projected audience is determined for the user service based on the user profile. In some implementations, a risk multiple percentage is determined based on the projected audience. The account management rate can be determined based on abase price combined with the risk multiple percentage.

In some implementations, the user profile has a feedback log. A time to respond can be found for the respondent service based on a length of time measured from when the respondent service is validated to when the respondent service sends the respondent evaluation. A first average response speed can be determined for the respondent service based on a log of previous times to respond. A second average response speed can be determined for the pool of respondent services. The time to respond can be compared to the first average response speed as well as to the second average response speed. In some implementations, in response to comparing the time to respond to the first average response speed as well as to the second average response speed, a respondent speed score is determined. The respondent evaluation can be compared to the autoscore as well as to the feedback from the user-specified domain to determine a current grade.

A log of respondent evaluations can be compared to a log of autoscores and the feedback log to determine a historical grade. In some implementations, a respondent quality score is determined for the respondent service based on a combination of the current grade, the historical grade, and the respondent speed score. The feedback log can include retweets, likes, news, interviews, and message boards. A response of the projected audience to a hypothetical user-attributable content can be projected based on the feedback log. In some implementations, the projected audience has a size. The size of the projected audience is determined based on the user profile and the feedback log. A change to the size of the projected audience can be projected based on the hypothetical user-attributable content.

Figure 5:
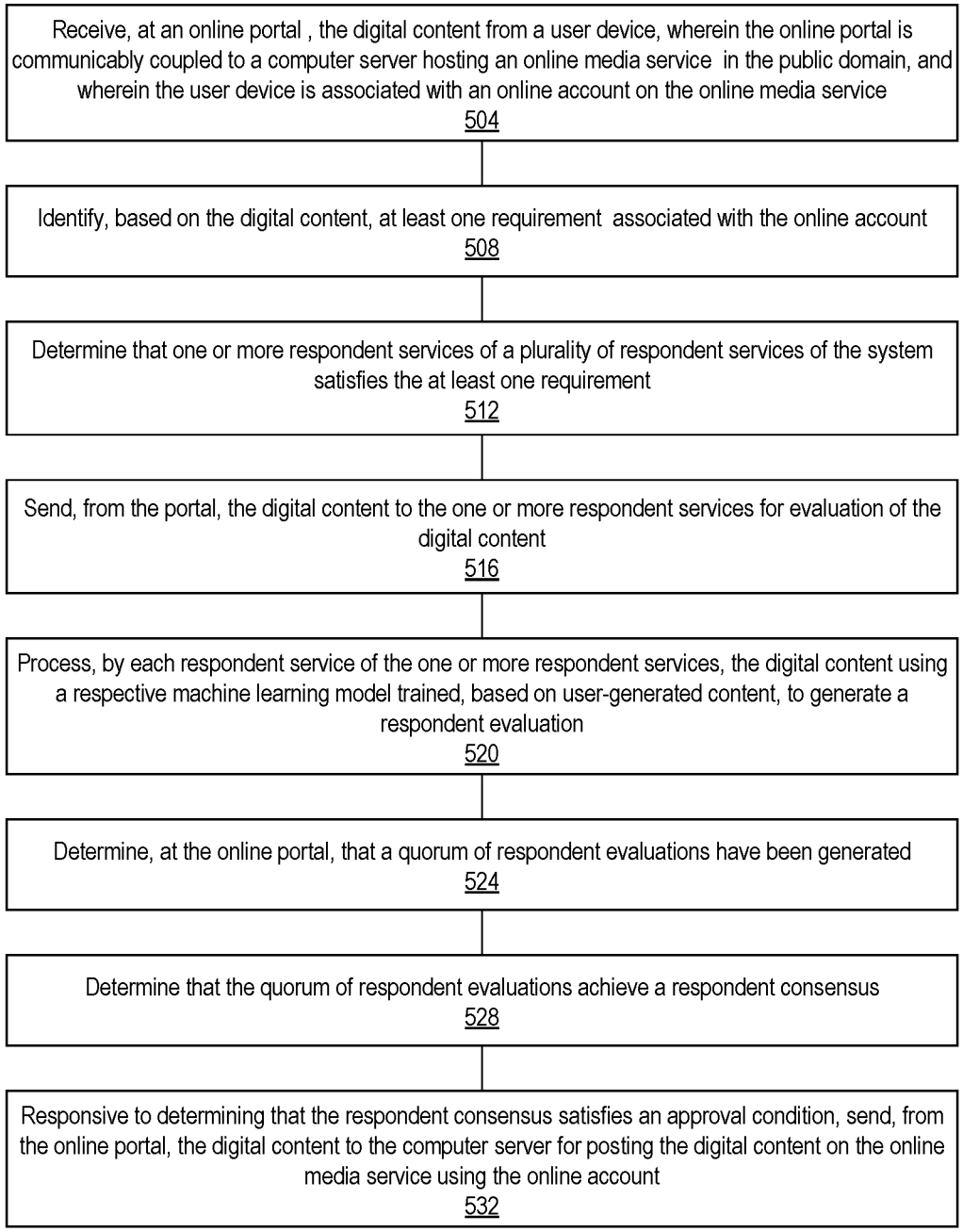
FIG. 5 is a flow diagram illustrating an example process for detecting and blocking the distribution of malicious content that is attributable to an entity.

FIG. 5 is a flow diagram illustrating an example process for detecting and blocking the distribution of malicious content that is attributable to an entity. In some implementations, the process of FIG. 5 is performed by a computer system, e.g., the example computer system 700 illustrated and described in more detail with reference to FIG. 7. Particular entities, for example, the ML system 600 perform some or all of the steps of the process in other implementations. The ML system 600 is illustrated and described in more detail with reference to FIG. 6. Likewise, implementations can include different and/or additional steps, or perform the steps in different orders.

In step 504, a computer system receives, at an online portal, digital content from a user device. The online portal is communicably coupled to a computer server hosting an online media service in the public or non-public domain. The user device is associated with an online account on the online media service. The digital content is attributable to the online account of the online media service.

In step 508, the computer system identifies, based on the digital content, at least one requirement associated with the online account. In some implementations, the at least one requirement can be an evaluation metric, in which those respondent services with an accuracy or an f1 score below a certain threshold, for example, are excluded from consideration. In other implementations, the at least one requirement can specify a particular content-type, for those respondent services specializing in a particular media format (e.g., text, picture, audio, video), or in a particular media service (e.g., video-sharing, message board, short messages to followers), or in a particular user-type (e.g., an athlete, a politician, a religious figure, a musician, a comedian).

In step 512, the computer system determines that one or more respondent service from multiple respondent services of the system satisfies the at least one requirement. In some implementations, step 512 can include determining a pod, wherein the pod is a respondent service chosen by the user service or by the administrative service to respond to the user-attributable content. In some implementations, determining the pod includes receiving a geographic data from the respondent service.

In step 516, the computer system sends, from the portal, the digital content to the one or more respondent services for evaluation of the digital content. In some implementations, step 516 can also send with the digital content an autoscore assigned by an autoscoring system extant on the user device. For example, the autoscoring system in such an implementation can be a bag-of-words model or other such basic heuristic which can occupy relatively little memory on a device.

In step 520, the computer system processes, by each respondent service of the one more respondent services, the digital content using a respective machine learning model trained based on user-attributable content, to generate a respondent evaluation. In some implementations, the respondent evaluation can include an explanation along with a most influential portion of the digital content, with regard to the evaluation. In other implementations, the explanation and influential portion can further include suggested corrections or alterations to the influential portion, and a potential autoscore if such corrections or alterations were made.

In step 524, the computer system determines, at the online portal, that a quorum of respondent evaluations have been generated. In some implementations, the quorum can be set by an administrative account, the user portal being attached to the administrative account. In other implementations, the quorum can be circumvented by a secondary requirement, for example, time to respond. In such an implementation, if the quorum cannot be met within a certain time, the process can proceed to the next step.

In step 528, the computer system determines that the quorum of respondent evaluations achieve a respondent consensus. In some implementations, the respondent consensus is a unanimous agreement among the quorum of respondent evaluations. In other implementations, the respondent consensus is a vote taken among the quorum of respondent evaluations. In such implementations, the vote can be strictly for or against, or the vote can be a partial score representing some percentage of support for various potential decisions.

On the determination that the respondent consensus satisfies an approval condition in step 532, the computer system sends the digital content from the online portal to the computer server. The computer server posts the digital content on the online media service using the online account. In some implementations, the approval condition is set by the administrative account. In other implementations, the approval condition is a function of a risk score, determined based on user characteristics taken from the user account on the media service (e.g., number of followers).

Figure 6:
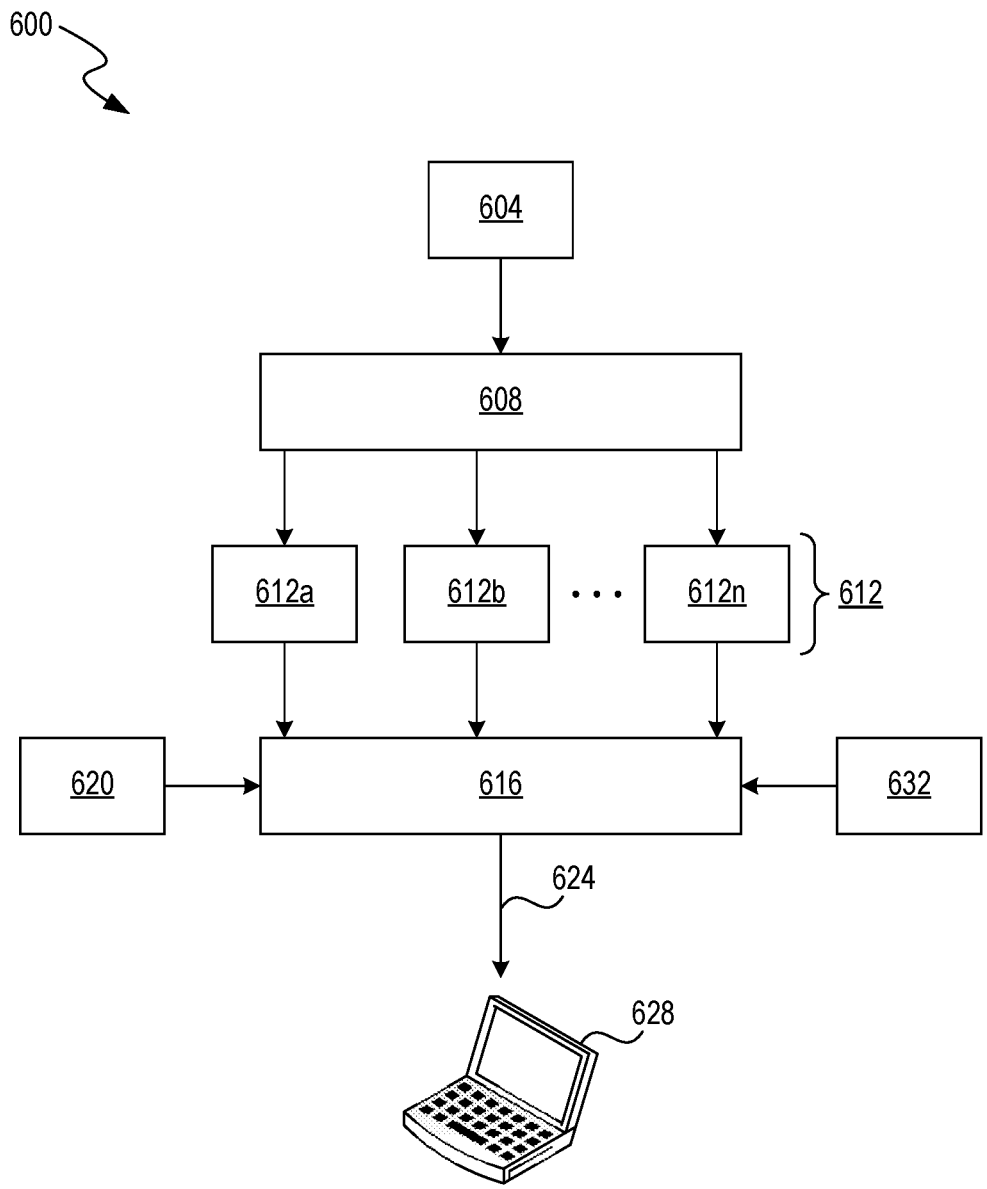
FIG. 6 is a block diagram illustrating an example machine learning (ML) system.

FIG. 6 is a block diagram illustrating an example machine learning (ML) system 600. The ML system 600 is implemented using components of the example computer system 700 illustrated and described in more detail with reference to FIG. 7. For example, the ML system 600 can be implemented on the computer system 700 using instructions 708 programmed in the main memory 706 illustrated and described in more detail with reference to FIG. 7. Likewise, implementations of the ML system 600 can include different and/or additional components or be connected in different ways. The ML system 600 is sometimes referred to as a ML module.

The ML system 600 includes a feature extraction module 608 implemented using components of the example computer system 700 illustrated and described in more detail with reference to FIG. 7. In some implementations, the feature extraction module 608 extracts a feature vector 612 from input data 604. For example, the input data 604 is user-attributable content. The feature vector 612 includes features 612a, 612b, . . . , 612n. The feature extraction module 608 reduces the redundancy in the input data 604, e.g., repetitive data values, to transform the input data 604 into the reduced set of features 612, e.g., features 612a, 612b, . . . , 612n. The feature vector 612 contains the relevant information from the input data 604, such that events or data value thresholds of interest can be identified by the ML model 616 by using a reduced representation. In some example implementations, the following dimensionality reduction techniques are used by the feature extraction module 608: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In some implementations, the ML model 616 performs deep learning (also known as deep structured learning or hierarchical learning) directly on the input data 604 to learn data representations, as opposed to using task-specific algorithms. In deep learning, no explicit feature extraction is performed; the features 612 are implicitly extracted by the ML system 600. For example, the ML model 616 can use a cascade of multiple layers of nonlinear processing units for implicit feature extraction and transformation. Each successive layer uses the output from the previous layer as input. The ML model 616 can thus learn in supervised (e.g., classification) and/or unsupervised (e.g., pattern analysis) modes. The ML model 616 can learn multiple levels of representations that correspond to different levels of abstraction, wherein the different levels form a hierarchy of concepts. The ML model 616 can be configured to differentiate features of interest from background features.

In one example, the ML model 616, e.g., in the form of a CNN generates the output 624, without the need for feature extraction, directly from the input data 604. For example, the output 624 is a respondent evaluation. In some examples, the output 624 is provided to the computer device 628 or video display 718. The computer device 628 is a server, computer, tablet, smartphone, smart speaker, etc., implemented using components of the example computer system 700 illustrated and described in more detail with reference to FIG. 7. In some implementations, the steps performed by the ML system 600 are stored in memory on the computer device 628 for execution.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 616 can be a CNN that includes both convolutional layers and max pooling layers. The architecture of the ML model 616 can be "fully convolutional," which means that variable sized sensor data vectors can be fed into it. For all convolutional layers, the ML model 616 can specify a kernel size, a stride of the convolution, and an amount of zero padding applied to the input of that layer. For the pooling layers, the model 616 can specify the kernel size and stride of the pooling.

The ML model 616 can be a GPT (General Purpose Transformer), a Transformer, or an ML model including an attention mechanism. The ML model 616 can comprise two linked sub-models, called an Encoder and a Decoder, in which the Encoder includes a self-attention mechanism and a feed-forward neural network. The self-attention mechanism and feed-forward neural network are configured to calculate the relationship of each part of an input (e.g., a token from a written message, a pixel from a picture, or a frame from a video) to every other part of the input, ultimately producing a positional encoding as output. The positional encoding is used as input for the Decoder, which includes its own self-attention mechanism and feed-forward neural network, as well as an encoding attention mechanism, which are configured to produce a decoded output matching the type of the input to the encoder (e.g., a written message, a picture, or a video).

In some implementations, the ML system 600 trains the ML model 616, based on the training data 620, to correlate the feature vector 612 to expected outputs in the training data 620. As part of the training of the ML model 616, the ML system 600 forms a training set of features and training labels by identifying a positive training set of features that have been determined to have a desired property in question, and, in some implementations, forms a negative training set of features that lack the property in question.

The ML system 600 applies ML techniques to train the ML model 616, that when applied to the feature vector 612, outputs indications of whether the feature vector 612 has an associated desired property or properties, such as a probability that the feature vector 612 has a particular Boolean property, or an estimated value of a scalar property. The ML system 600 can apply dimensionality reduction (e.g., via linear discriminant analysis (LDA), PCA, or the like) to reduce the amount of data in the feature vector 612 to a smaller, more representative set of data.

The ML system 600 can use supervised ML to train the ML model 616, with feature vectors of the positive training set and the negative training set serving as the inputs. In some implementations, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example implementations, a validation set 632 is formed of additional features, other than those in the training data 620, which have already been determined to have or to lack the property in question. For example, the validation set 632 can include [FILL IN SOMETHING HERE]. The ML system 600 applies the trained ML model 616 to the features of the validation set 632 to quantify the accuracy of the ML model 616. Common metrics applied in accuracy measurement include: Precision and Recall, where Precision refers to a number of results the ML model 616 correctly predicted out of the total it predicted, and Recall is a number of results the ML model 616 correctly predicted out of the total number of features that had the desired property in question. In some implementations, the ML system 600 iteratively re-trains the ML model 616 until the occurrence of a stopping condition, such as the accuracy measurement indication that the ML model 616 is sufficiently accurate, or a number of training rounds having taken place. The detected values can be validated using the validation set 632. The validation set 632 can be generated based on analysis to be performed.

Figure 7:
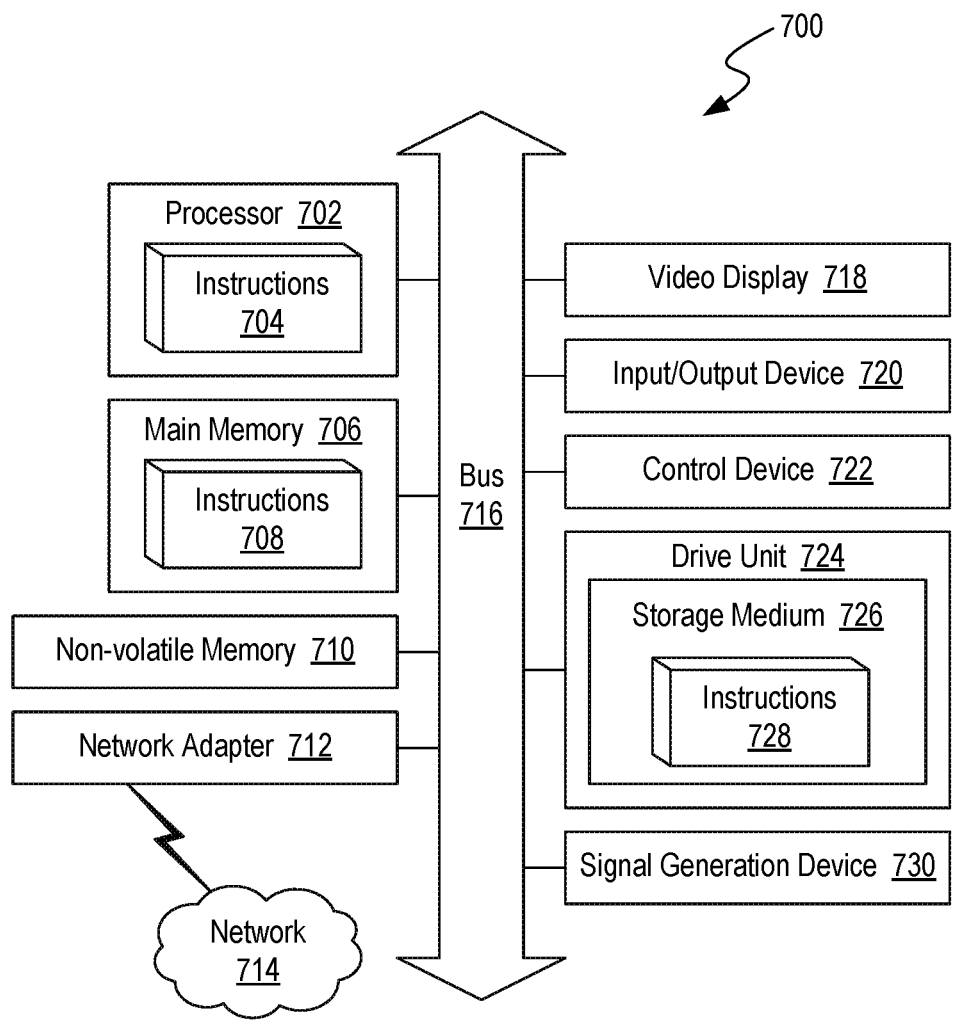
FIG. 7 is a block diagram illustrating an example computer system.

FIG. 7 is a block diagram illustrating an example computer system, in accordance with one or more implementations. In some implementations, components of the example computer system 700 are used to implement the system 400 for detecting and blocking the distribution of malicious content that is attributable to an entity or the ML system 600 illustrated and described in more detail with reference to FIGS. 4 and 6. At least some operations described can be implemented on the computer system 700.

The computer system 700 can include one or more central processing units ("processors") 702, main memory 706, non-volatile memory 710, network adapters 712 (e.g., network interface), video displays 718, input/output devices 720, control devices 722 (e.g., keyboard and pointing devices), drive units 724 including a storage medium 726, and a signal generation device 730 that are communicatively connected to a bus 716. The bus 716 is illustrated as an abstraction that represents one or more physical buses and/or point-to-point connections that are connected by appropriate bridges, adapters, or controllers. The bus 716, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 700 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 700.

While the main memory 706, non-volatile memory 710, and storage medium 726 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 728. The term "machine-readable medium" and "storage medium" shall also be taken to include any medium that is capable of storing, encoding, or carrying a set of instructions for execution by the computer system 700.

In general, the routines executed to implement the implementations of the disclosure can be implemented as part of an operating system or a specific application, component, program, object, module, or sequence of instructions (collectively referred to as "computer programs"). The computer programs typically include one or more instructions (e.g., instructions 704, 708, 728) set at various times in various memory and storage devices in a computer device. When read and executed by the one or more processors 702, the instruction(s) cause the computer system 700 to perform operations to execute elements involving the various aspects of the disclosure.

Moreover, while implementations have been described in the context of fully functioning computer devices, those skilled in the art will appreciate that the various implementations are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 710, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 712 enables the computer system 700 to mediate data in a network 714 with an entity that is external to the computer system 700 through any communication protocol supported by the computer system 700 and the external entity. The network adapter 712 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 712 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

Figure 8:
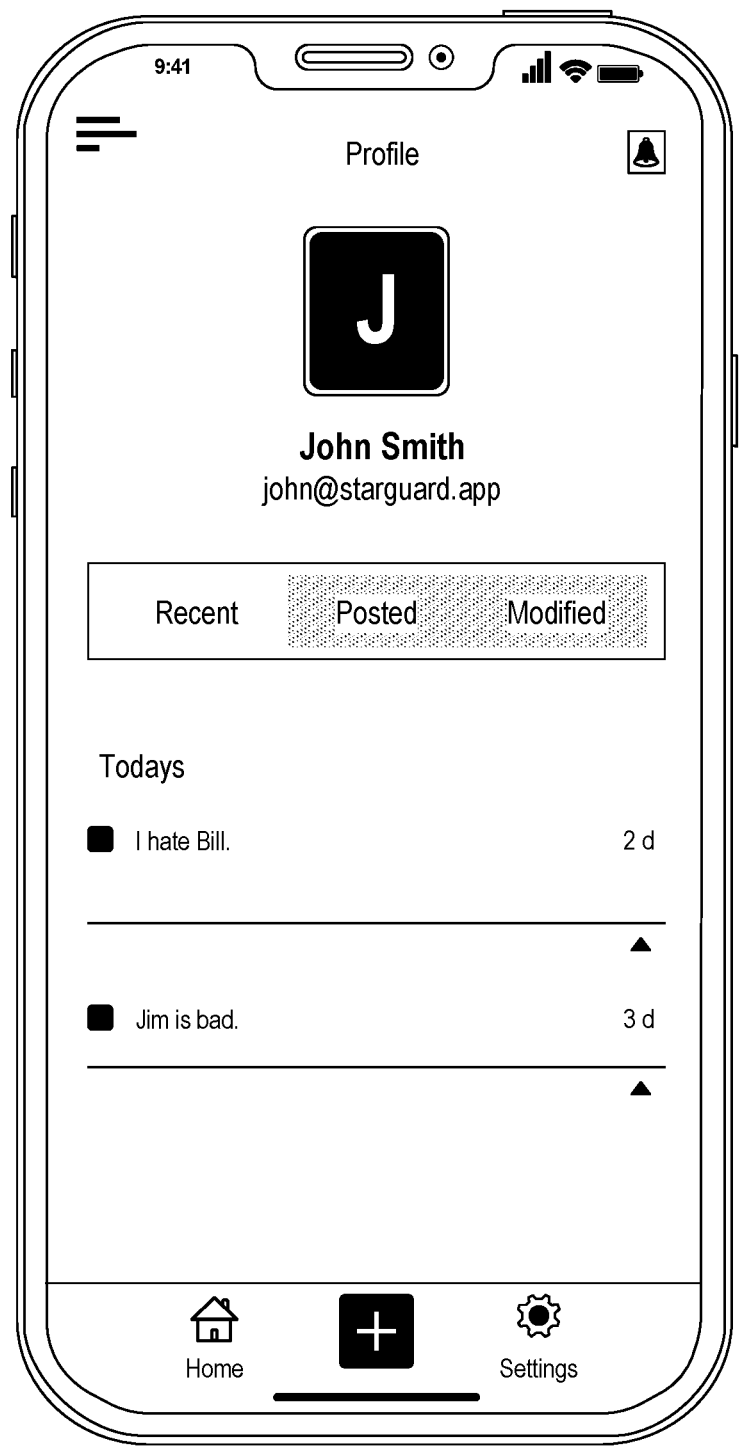
FIG. 8 is an example of a view of a user interface from a user portal.

FIG. 8 is an example of a view of a user interface from a user portal. At an online user portal, digital content is received from a user device. The online portal is communicably coupled to a computer server hosting an online media service in the public or non-public domain. The user device is associated with an online account on the online media service. In some implementations, based on the digital content, at least one requirement associated with the online account is identified. In some implementations, a computer system determines that one or more respondent services from multiple respondent services of the system satisfies the at least one requirement.

Figure 9:
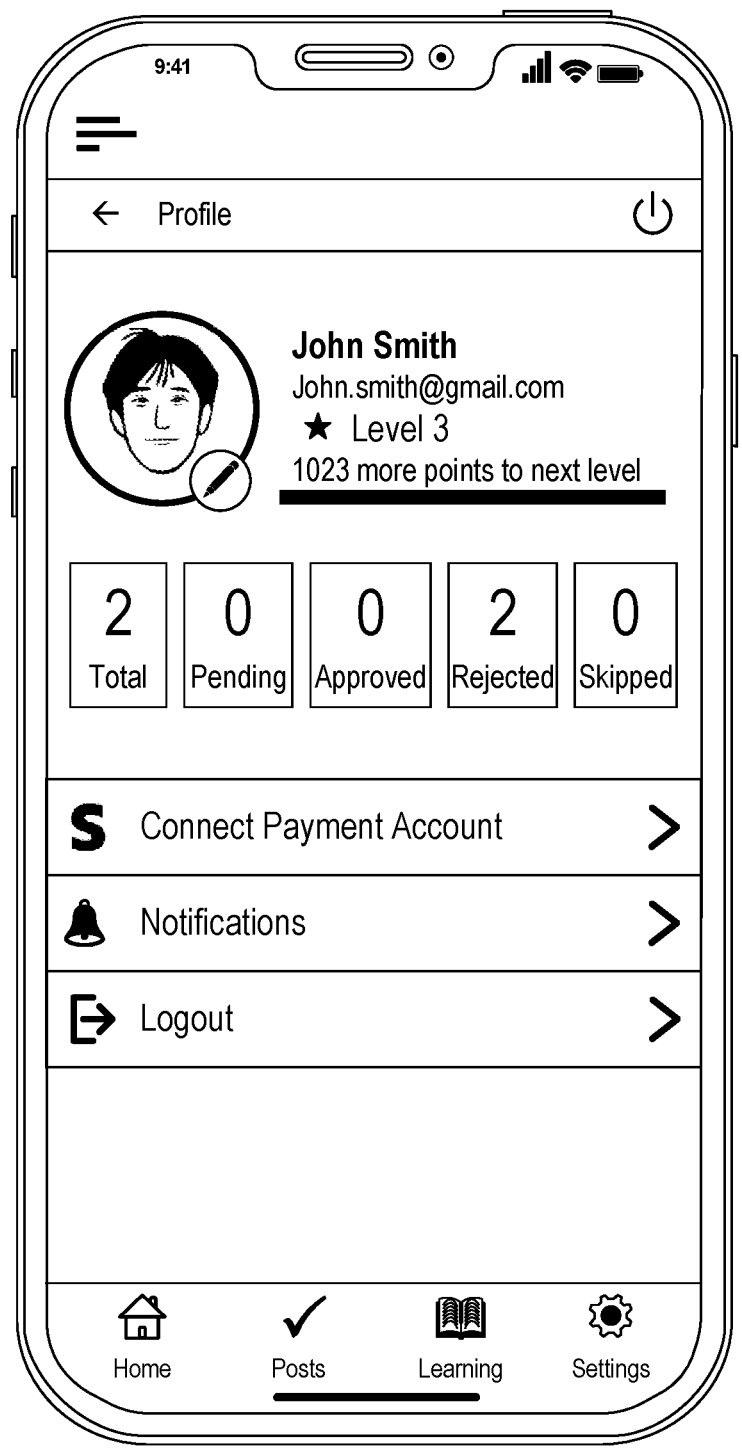
FIG. 9 is an example of a view of a user interface from a respondent service.

FIG. 9 is an example of a view of a user interface from a respondent service. From a user portal, digital content is sent to one or more respondent services for evaluation of the digital content. By each respondent service of the one or more respondent services, the digital content is processed using a respective machine learning model trained, based on user-attributable content, to generate a respondent evaluation. At the online portal, is determined that a quorum of respondent evaluations have been generated. It is determined that the quorum of respondent evaluations achieve a respondent consensus. Responsive to determining that the respondent consensus satisfies an approval condition, from the online portal, the digital content is sent to the computer server for posting the digital content on the online media service using the online account.

Figure 10:
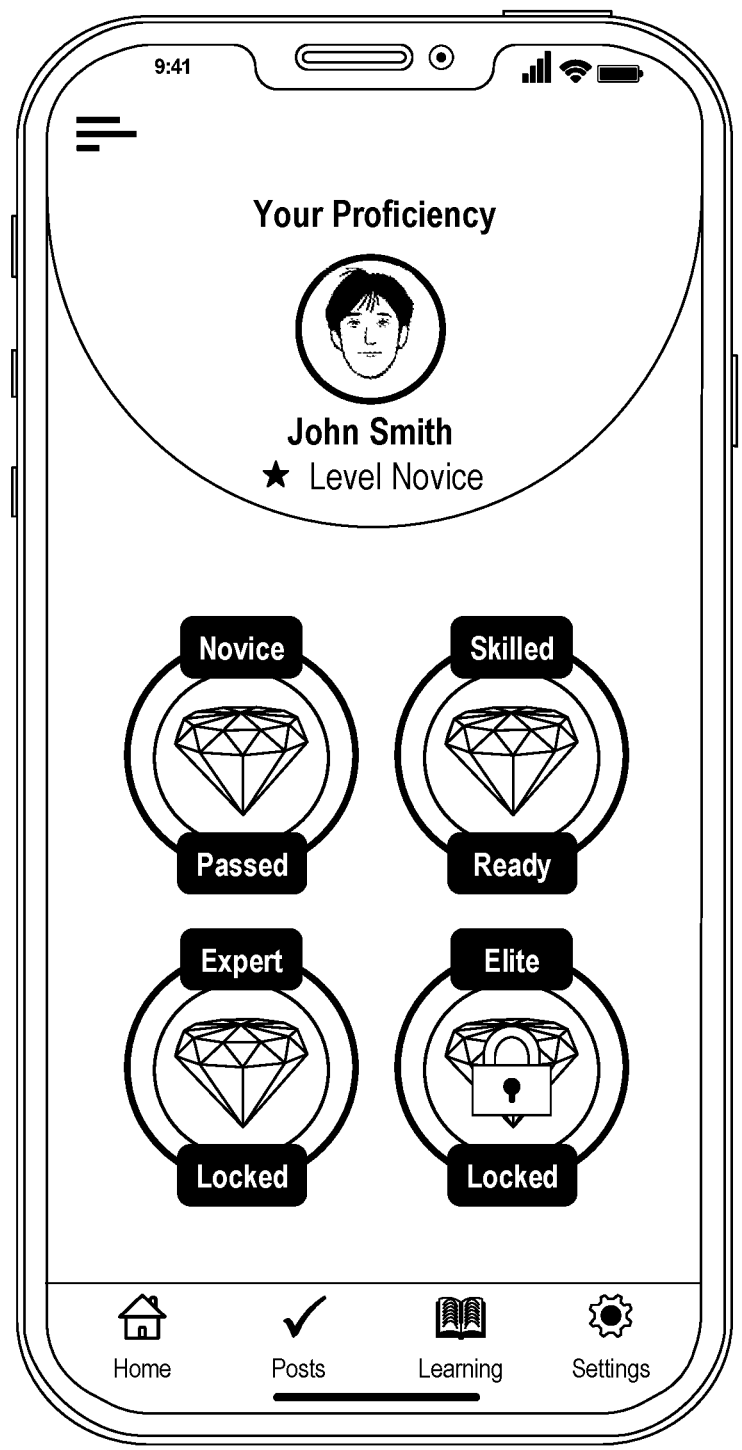
FIG. 10 is an example of a learning module user interface from a respondent service.

FIG. 10 is an example of a learning module user interface from a respondent service. In some implementations, user-attributable content is sent to a respondent management system overseeing a pool of respondent services. An invitation from the respondent management system is sent to the pool of respondent services. In some implementations, the invitation is accepted by a respondent service from the pool of respondent services. The respondent service is validated to meet a set of respondent requirements. In the respondent service, the user-attributable content is processed in a machine learning model trained to output a respondent evaluation from an inputted user-attributable content. The respondent evaluation is sent from each respondent service to the user service. In some implementations, the computer system waits for a quorum of respondent evaluations to be generated. A respondent consensus is formed from the quorum of respondent evaluations. The user-attributable content is sent to a user-specified public or non-public domain when the respondent consensus satisfies an approval condition.

The functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed implementations.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings are illustrative and are not to be construed as limiting. Numerous specific details are described to provide a thorough understanding of the disclosure. However, in certain instances, well-known details are not described in order to avoid obscuring the description. Various modifications can be made without deviating from the scope of the implementations.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed, nor is any special significance to be placed upon whether or not a term is elaborated or discussed. Synonyms for certain terms are provided. A recital of one or more synonyms does not exclude the use of other synonyms. The use of examples anywhere in this specification, including examples of any term discussed, is illustrative only and is not intended to limit the scope and meaning of the disclosure or of any exemplified term. Likewise, the disclosure is not limited to various implementations given in this specification.

It is to be understood that the implementations and variations shown and described are merely illustrative of the principles of this invention and that various modifications can be implemented by those skilled in the art.

I claim:

1. A system for detecting and blocking distribution of malicious content that is attributable to a user, the system comprising:
  one or more memory devices storing instructions; and
  one or more processors configured to execute the instructions to:
    capture user-attributable content input at an endpoint device for distribution to one or more users of a media service,
      wherein the user-attributable content is attributable to a user of the media service based on an identity of the user that is referenced by the user-attributable content, and
      wherein the user is a type of user corresponding to a person or an organization having an account associated with the identity and registered with the media service;
    identify one or more respondent services of multiple respondent services,
      wherein the multiple respondent services are configured to process the user-attributable content using machine learning models that are trained to detect malicious content, and
      wherein the one or more respondent services are configured for a particular user-type or a particular content-type matching the type of user or a type of content of the user-attributable content;
send a copy of the user-attributable content to the one or more respondent services;
receive feedback from the one or more respondent services,
wherein the feedback includes an indication that the user-attributable content was processed by a quorum of respondent services;
generate a measure based on a consensus of the quorum of respondent services,
wherein the measure indicates that the user-attributable content is unlikely to include malicious content; and
release the user-attributable content for distribution to one or more users of the media service based on the measure.

2. The system of claim 1, wherein the user-attributable content is a first user-attributable content, and wherein another measure indicates that a second user-attributable content includes malicious content, the system being further caused to:
block the second user-attributable content from distribution on the media service.

3. A computer-implemented method comprising:
intercepting digital content input at an endpoint device,
wherein the digital content is designated for distribution to one or more users of a media service,
wherein the digital content is attributable to a user of the media service based on an identity of the user that is referenced by the digital content, and
wherein the user corresponds to a person or an organization having a user account associated with the identity and registered with the media service;
identifying one or more respondent services of multiple respondent services, each respondent service having respondent attributes, wherein at least one of the respondent attributes matches a requirement associated with the user account;
redirecting the digital content from the endpoint device to the one or more respondent services,
wherein the multiple respondent services are configured to process the digital content using machine learning models that are trained to detect malicious content;
receiving feedback from the one or more respondent services including an indication that the digital content was processed by a quorum of respondent services;
determining a measure based on a consensus of the quorum of respondent services,
wherein the measure indicates a likelihood that the digital content includes malicious content; and
performing an action affecting the distribution of the digital content to one or more users of the media service based on the likelihood that the digital content includes malicious content.

4. The method of claim 3, wherein the consensus measure indicates that the digital content includes malicious content, and wherein performing the action affecting the distribution of the digital content comprises:
blocking the digital content from distribution to the one or more users of the media service.

5. The method of claim 3, wherein the consensus measure indicates that the digital content precludes malicious content, and wherein performing the action affecting the distribution of the digital content comprises:
releasing the digital content for distribution to the one or more users of the media service.

6. The method of claim 3, wherein the consensus measure indicates that the digital content includes malicious content, and wherein performing the action affecting the distribution of the digital content comprises:
altering the malicious content to create edited content; and
releasing the edited content for distribution to the one or more users of the media service.

7. The method of claim 3, wherein intercepting the digital content input to the endpoint device comprises:
capturing the digital content by an Application Programming Interface (API) or a background application running on the endpoint device without direct user intervention,
wherein redirecting the digital content is performed by the API or the background application on the endpoint device.

8. The method of claim 3, wherein the method further comprises:
redirecting a copy of the digital content to an autoscoring system on the endpoint device,
wherein the autoscoring system is configured to process digital content using a compressed machine learning model that is trained to detect malicious content from user-attributable content, the compressed machine learning model having a size that is dependent on available computer resources in the endpoint device;
receiving a score output by the autoscoring system,
wherein the score is available on the endpoint device before the consensus from the quorum of respondent services; and
configuring the autoscoring system to make an adjustment to the compressed machine learning model, the adjustment having a magnitude based on a difference between the score and at least one of the consensus measure or the feedback.

9. The method of claim 3 further comprising:
defining the requirement associated with the user account based on a data input from an administrative service associated with an administrator which includes a person or an organization having an administrator account, running on an administrative endpoint device, the requirement imposed on the user account.

10. The method of claim 3, wherein the feedback includes an individual output from each one of the multiple respondent services, each one of the multiple respondent services further including a learning module which is configured to process a copy of the consensus and adjust the machine learning models of that respondent service according to a difference between the consensus and the individual output of that respondent service, wherein the method further comprises:
sending a copy of the feedback and a copy of the consensus measure to a particular learning module of a particular respondent service; and
causing adjustment to the machine learning model for the particular respondent service,
wherein the adjustment is based on the difference between the individual output of the particular respondent service and the copy of the consensus.

11. The method of claim 3, wherein the feedback from the one or more respondent services further includes alterations to the digital content, the method further comprising:
altering the digital content according to the alterations included in the feedback to produce an altered digital content;

determining a subsequent consensus measure from the quorum of respondent services, the consensus indicating that the altered digital content is non-malicious; and releasing the altered digital content for distribution to one or more users of the media service, wherein the subsequent consensus satisfies an approval condition associated with the user account.

12. The method of claim 3, wherein identifying one or more respondent services of multiple respondent services comprises:

identifying a particular respondent service selected by the person or the organization associated with the user account or an administrator of the user account.

13. The method of claim 3, wherein identifying one or more respondent services of multiple respondent services further comprises:

identifying a particular respondent service based on a geographic location of the person or the organization associated with the user account or an administrator of the user account.

14. The method of claim 3, wherein identifying one or more respondent services of the multiple respondent services comprises:

identifying a subset of the multiple respondent services requiring less than a threshold amount of time to provide feedback; and selecting the one or more respondent services from among the subset of the multiple respondent services.

15. The method of claim 3, wherein the user account has an account management rate, the method further comprising:

identifying a projected audience for the user account based on the identity of the user;

designating a risk factor based on the projected audience; and determining the account management rate based on the risk factor and a minimum number of respondent services.

16. The method of claim 15, wherein determining the measure comprises:

projecting a response of the projected audience to the digital content based on at least one of comments, retweets, likes, news, interviews, or message boards from the one or more users on the media service.

17. The method from claim 16 further comprising:

projecting the response to a hypothetical digital content based on a history of feedback; and projecting a change to a size of the projected audience based on the hypothetical digital content.

* * * * *